Oct. 29, 1968   H. M. McCONNELL   3,408,310
METAL-ORGANIC ALLOY COMPOSITION AND PROCESS OF MAKING SAME
Filed July 26, 1965   3 Sheets-Sheet 1

INVENTOR.
HARDEN M. MC. CONNELL
BY
ATTORNEY

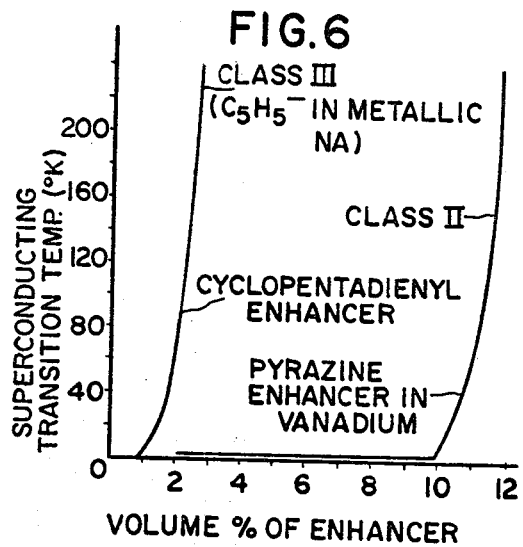
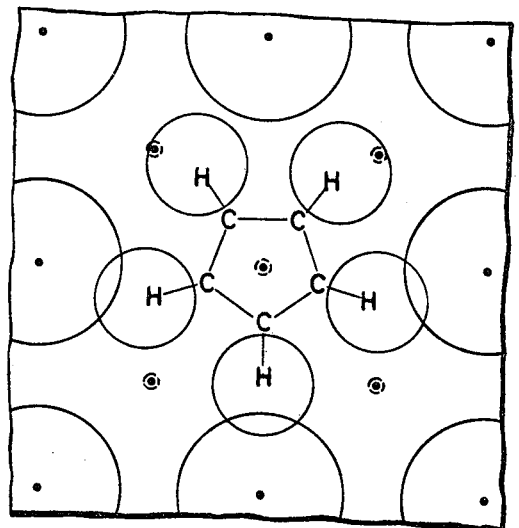
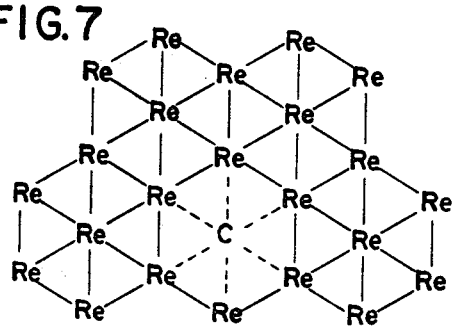
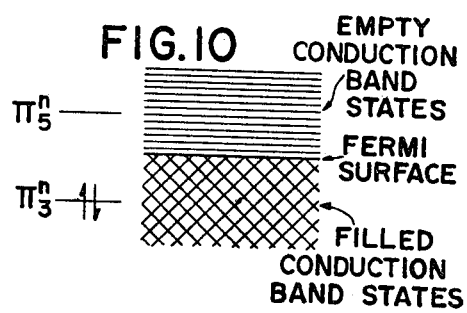
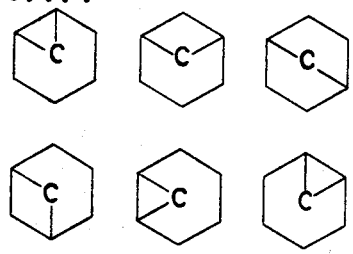
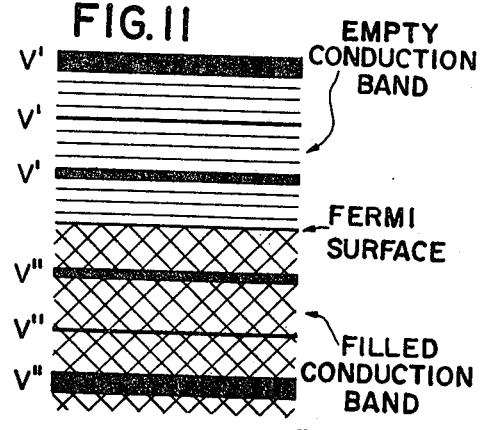

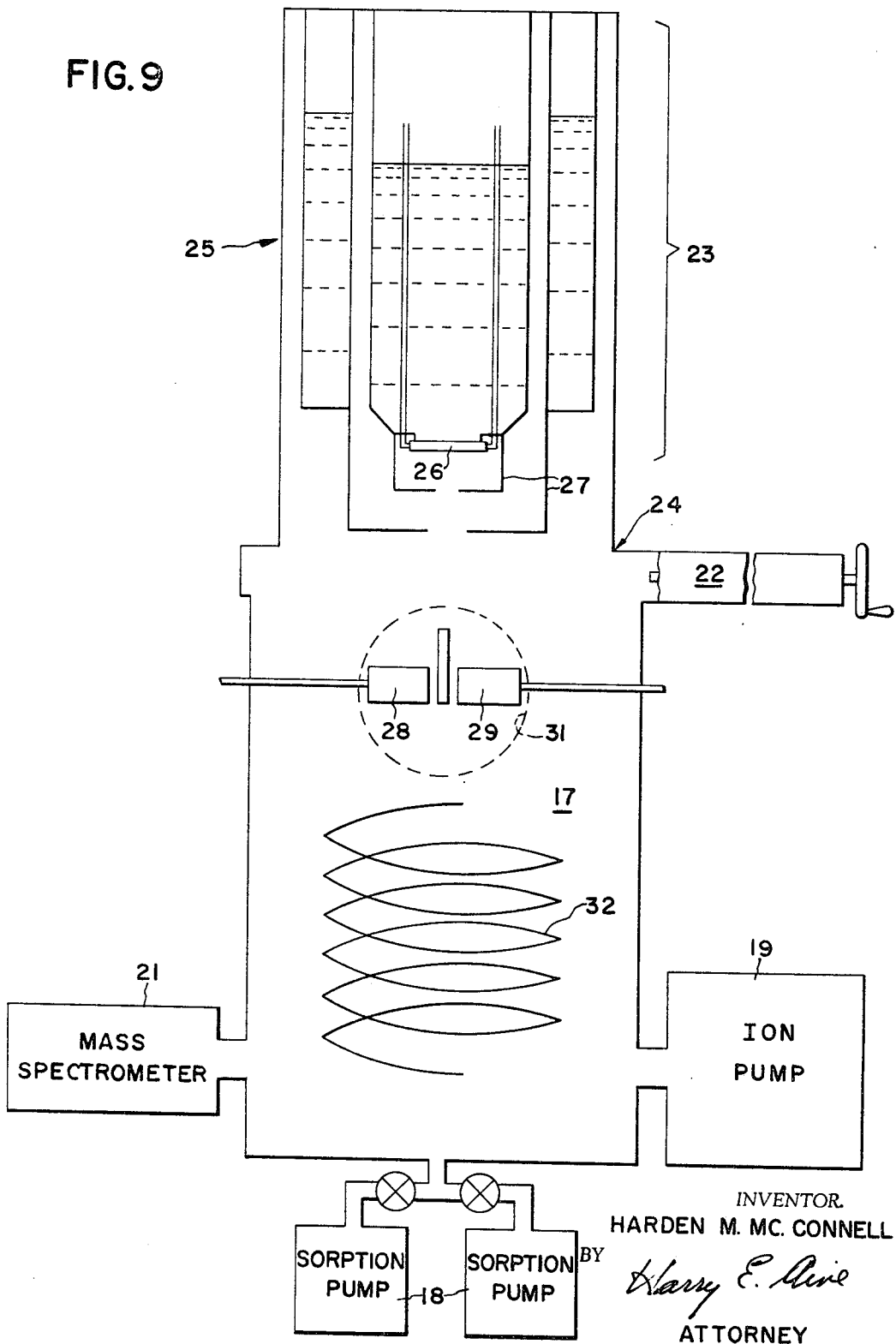

United States Patent Office 3,408,310
Patented Oct. 29, 1968

3,408,310
METAL-ORGANIC ALLOY COMPOSITION AND
PROCESS OF MAKING SAME
Harden M. McConnell, Stanford, Calif., assignor to
Varian Associates, Palo Alto, Calif., a corporation
of California
Filed July 26, 1965, Ser. No. 474,708
25 Claims. (Cl. 252—512)

ABSTRACT OF THE DISCLOSURE

Alloys of metals and organic molecules are produced by co-depositing from the gaseous phase (or by depositing in sequence from the gaseous phase) a metal or a conventional metal alloy and organic molecules. In a preferred method these components are deposited on a supercold (liquid helium temperature) surface at an ultra low pressure. The end product may be a substantially homogeneous alloy or a laminar product having a very thin layer or film of metal upon which is deposited a thin layer or film of organic molecules, such laminar structure being repeated if desired. The organic molecules include organic free radicals (provided they are not paramagnetic when incorporated in or on the metal) and they also include organo-metallic compounds. If the metal and organic molecules are appropriately selected, a superconductor is produced whose critical temperature, $T_c$, is greater than that of the metal alone. In any event novel and useful compositions are provided.

---

Figure 1:
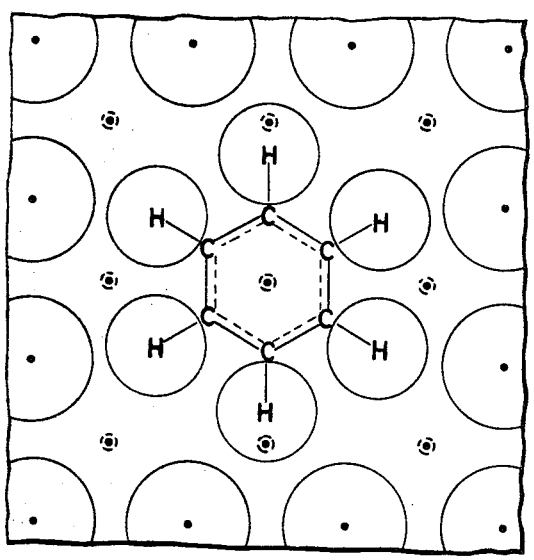

The present invention relates in general to a novel composition of matter and to methods of making same, and more particularly to novel metal-molecule alloys having certain enhanced properties compared to the metal without the molecules incorporated therein. Such enhanced properties includes superconductivity. Superconducting materials are especially useful for many electrical and magnetic applications, where a conductor having zero resistance would be useful, such as, for example, power transmission lines, and electrical solenoids among many other important uses.

It has been known for many years that a special kind of electron energy gap is necessary for superconductivity. This can be seen qualitatively, as follows. We imagine a collection of electrons moving as a supercurrent through a metallic lattice. In the absence of externally applied fields, there are no forces acting on the collection of electrons as a whole, tending to stop the supercurrent in motion. On the other hand, individual electrons can be scattered by collisions with impurities, defects, or lattice motions (thermal phonons). However, if the moving electron is somehow attracted to, or bound to the other moving electrons, then it will be more difficult to modify the collective electronic motion. In particular, if the "binding energy," or energy gap for a single electronic excitation is much larger than the thermal energies available from random lattice vibrations, then the stopping or deviation in motion of individual electrons becomes exceedingly unlikely also. This superconducting energy gap has been the subject of extensive experimental and theoretical study.

It follows directly from the work of Cooper, and Bardeen, Cooper and Schrieffer (BCS), that a net attractive interaction between electrons in a metal leads to an energy gap and to superconductivity.

The attractive electron-electron interaction required for an energy gap and for superconductivity is, at least in many superconductors, thought to arise from an interaction between the conduction electrons and electrical oscillations of the positive ions in a metallic lattice. A metallic conductor is like a lattice of positive ions immersed in a sea of electrons (conduction electrons) which are free to move about. According to the BCS theory, a first electron excites an oscillation of the ions about their mean positions in the lattice, and these oscillations look attractive to the second electron having a proper phase delay. It is of course essential that this attractive interaction exceed the electron-electron repulsion.

Heretofore it has been proposed to enhance the binding energy and thus increase the transition temperature of metals by cross alloying known superconducting metals. Such cross alloying such as $Nb_3Sn$ has yielded substantially enhanced superconducting material compared to either pure niobium or pure tin which have a superconducting transition temperature of about 9.5° K. and 3.7° K., respectively, but the alloy of which possess the highest known transition temperature of about 18° K. The detailed reasons for the unexpected enhancement in transition temperature for this alloy remain unexplained. Attempts to raise the transition temperature of this alloy or obtain other metal alloys with higher transition temperatures have, thus far, been unsuccessful.

Other previous proposals for enhanced superconductivity include metal-enhancer molecule systems wherein certain chemical molecules have high electric polarizability, i.e., capable of providing a large separation between the induced positive and negative electric poles of the molecule, are incorporated in or on a metallic lattice to form an electronic oscillator for coupling to and binding electron pairs. Such prior enhancer molecules were selected to have a highly conductive structure for free flow of charge from one end to the other and preferably included a pair of charge localizing atoms at opposite ends of an elongated conjugated molecule. In such a manner a large electric dipole moment could be obtained. An example of this type of enhancer molecule would be the dye molecules.

The conjugation of the dye (enhancer) molecules was isolated electrically, as by steric hinderance, from the conduction electrons of the metal to prevent shorting out of the dye molecule electronic oscillation by the metallic conductor. This dye type of molecular electronic oscillator generates a larger amplitude oscillatory positive potential than that generated by the ions of the lattice for binding the electron pairs but the conduction electrons of the metal cannot approach as close to this potential as they did that for the ions of the lattice due to the fact that the dye enhancer molecule is not conductively connected to the conduction electrons of the lattice as are the positive ions of the more conventional metallic superconductors.

In the present invention, a superconducting material is formed by a metallic lattice having incorporated therein certain specific types of chemicals, referred to herein as "enhancer" molecules. The enhancer molecules are selected for their certain strong electric modes of oscillation which when incorporated into the metallic lattice produce a strong electronic coupling to the conduction electrons of the lattice thereby producing high electron pair binding energies and commensurately high superconducting transition temperatures. By the term "strong" electronic coupling it is meant that the electronic coupling betwen the electric oscillations of the enhancer molecule, as incorporated in the lattice, and the conduction electrons of the lattice take place on a common atom of the metal-molecule system as contrasted with the prior metal-molecule system wherein the electronic oscillations of the enchancer molecule were conductively isolated (insulated) from conduction electrons of the lattice such that conduction electrons of the lattice could not flow to a comomn atom of the enhancer oscillator for interaction thereon.

In one embodiment of the present invention, hereinafter referred to as Class I systems, vibrationally produced charge density fluctuations in the shared binding electron charge of a conjugated enhancer molecule, due to vibrational distortions of the molecule, are coupled to the conduction electrons of the metallic lattice by conjugating the molecule into the lattice such that the lattice conduction elecrons flow through and interact with the charge density fluctuations of the periodically distorted conjugated enhancer molecule. This type of coupled electronic oscillation leads to modest enhancement of superconductivity with relatively large volume percentages of enhancer molecules.

In another embodiment of the present invention enhancer molecules are selected which possess both a conjugated and a non-conjugated coupled system of oscillating electron charges. The conjugated system as, for example, the $\pi$ orbitals of the molecules, are in turn conjugated to conduction electrons of the metallic lattice. This type of metal-enhancer molecule system is hereinafter referred to as a Class II system. The oscillations of the non-conjugated system of charges force oscillation of the conjugated system of the molecule. There is a strong electronic coupling between the conduction electrons of the metal which pass through the conjugated molecule with the forced oscillating charge of the conjugated system of the molecule. This leads to a very strong electron pair binding energy because the electronic interaction between the conduction electron pair and the electronic oscillating system takes place on the same atom of the enhancer molecule and moreover these electronic oscillations are of relatively large amplitude compared to the charge density fluctuation of Class I type enhancer molecules. Thus greater enhanced superconductivity is obtained with lower volume percentages of enhancer molecules in Class II type systems than is obtained in Class I systems.

In still another embodiment of the present invention an enhancer molecule is selected which is ionized and is further characterized by an electronic mode of oscillation when incorporated in the metal lattice. This ionized enhancer molecule is not conductively connected into the lattice for free flow of conduction electrons through the molecule but rather the molecule is conductively isolated from the lattice. However, the fixed or ion charge on the molecule is closely spaced to the atoms of the metallic lattice such as to induce an image charge in the adjacent regions of the lattice. This image charge is displaced by conduction electrons flowing through the image charge region thereof causing the image charge to oscillate back and forth in the lattice across the enhancer molecule. Therefore the enhancer molecule in the lattice appears as a relatively large virtual oscillator. This virtual electronic oscillator includes the enhancer molecule and its adjacent lattice atoms and strong electronic interaction is obtained between conduction electrons of the lattice and the oscillating image charge on common lattice atoms of the enhancer virtual oscillator system. This strong interaction gives rise to a very strong electron pair binding energy and enhanced superconductivity. This type of metal-enhancer molecule system is hereinafter referred to as a Class III system.

In the metal-enhancer molecule systems of the present invention, which include Class I, II and III systems, the enhancer molecules may be surrounded on all sides by metal atoms, or only on two sides (as in metal-molecule-metal pancake array), or only on one side (enhancer-molecules on a metal surface). The purpose of the enhancer molecule is to increase the superconducting transition temperature, and/or critical current, and/or critical field of the metal-enhancer molecule system over that of the metal alone.

The principal object of the present invention is the provision of an improved superconducting material and methods of making same.

One feature of the present invention is the provision of a metal-enhancer molecule composition of matter wherein the enhancer molecules, as incorporated in the metallic lattice, have an electronic mode of oscillation. This mode of oscillation is electronically coupled to conduction electrons of the lattice on a common atom of the metal-molecule system whereby strong electron pair binding energies and enhanced superconductivity are obtained for the composition.

Another feature of the present invention is the provision of a metal-enhancer molecule composition of matter wherein enhancer molecules are conjugated with the metal in which or on which they are incorporated whereby enhanced superconductivity is obtained.

Another feature of the present invention is the same as the preceding feature wherein the enhancer molecule includes an electronically coupled conjugated and non-conjugated system of oscillating charges with the conduction electrons of the lattice flowing through the conjugated system of oscillating charges.

Another feature of the present invention is the same as the preceding wherein the enhancer molecules are selected from a class which conductively conjugate either singly or multiply with the metal or the metal-enhancer molecule composition.

Another feature of the present invention is the provision of an improved superconducting material wherein ionized enhancer molecules are incorporated into a metallic lattice and said molecules are not conductively connected to the conduction electrons of the lattice.

Another feature of the present invention is the same as any one of the preceding wherein the composition of matter is formed by codepositing metal atoms and enhancer molecules either simultaneously or at spaced time intervals which latter method produces successive layers of metal and molecules one upon the other.

Figure 2:
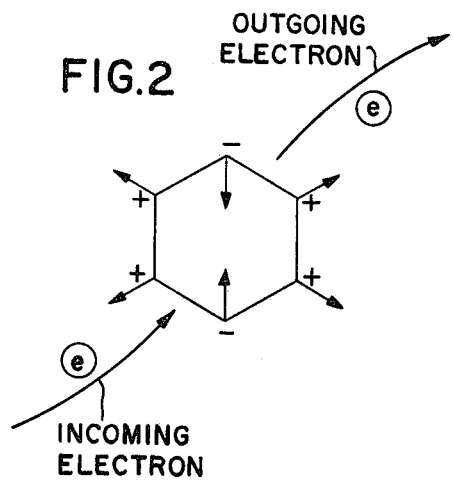
Figure 3:
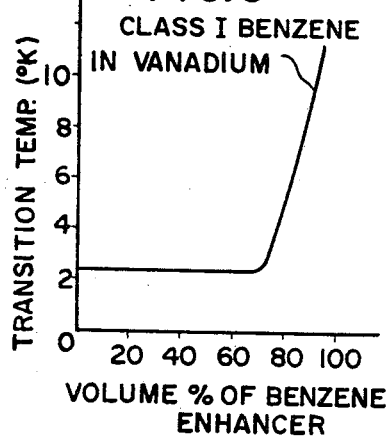
Figure 4:
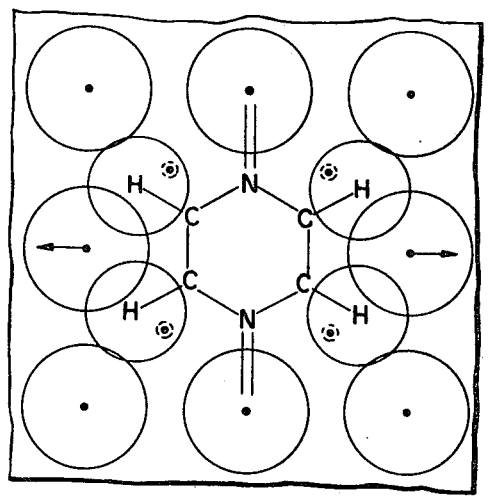
Figure 5:
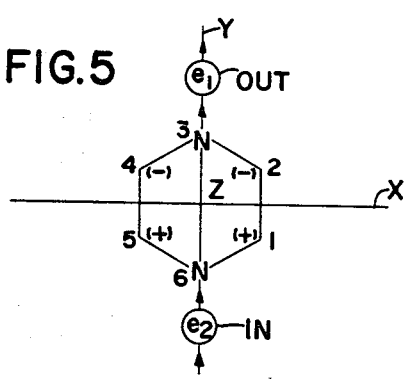

Other features and advantages will become apparent upon a perusal of the following specification taken in connection with the accompanying drawings wherein:

FIG. 1 is a schematic diagram of a benzene enhancer molecule conductively conjugatively bonded into a metallic vanadium lattice to form a Class I superconductor material of the present invention, FIG. 2 is a schematic diagram of the current flow through the benzene enhancer molecule of FIG. 1 interacting with an excited vibrational mode thereof, FIG. 3 is a plot of superconducting transition temperature versus volume percentage of benzene enhancer molecules in a thin film vanadium lattice, FIG. 4 is a schematic diagram of a pyrazine enhancer molecule conductively conjugatively bonded into a vanadium lattice to form a Class II superconductor material of the present invention, FIG. 5 is a schematic diagram of a pyrazine molecule with electron current flow therethrough and depicting a mechanism for electronic pairing of the conduction electrons by an electronic mode of oscillation of the pyrazine molecule, (iii) Compounds containing both aromatic and olefinic groups
   styrene
   1,3 and 1,4 divinyl benzenes
   1,4-diphenyl butadiene
   diphenyl ethylene
   p-amino styrene
   p-nitro styrene
(iv) Any of the compounds of classes (i)-(iii) above having other substituents, including but not limited to conjugated substituents such as carbonyl, thiocarbonyl, ether and thioether.
(v) Organometalic compounds
   ferrocene
   stannocene $(Sn(C_5H_5)_2)$
   plumbocene $(Pb(C_5H_5)_2)$
   tetraphenyl lead
   nickel carbonyl
   iron carbonyl
   tungsten carbonyl Specifically excluded from Class I enhancer molecules are diamagnetic aromatic or heteroaromatic molecules that are highly substituted with electronegative groups to produce a molecule with a very high electron affinity, as chloranil or tetracyanquinodimethan, and related molecules. Also specifically excluded are phthalocyanine and derivatives that tend to coordinate metal atoms in such a way as to form a localized paramagnetic state.

The preferred enhancer molecules of the Class I superconductors are expected to be effective in all metals, the atoms of which form covalent $\pi$-bonds with these enhancer molecules, including carbon monoxide (which forms $\sigma$, $\pi$-bonds—see later).

The metals included are
(i) known transition metal superconductors
(ii) known non-transition metal superconductors
(iii) known superconducting alloys
(iv) all other elemental metals, excepting
   (a) ferromagnetic or antiferromagnetic metals (e.g., Cr, Mn, Fe, Co, Ni)
   (b) the lanthanides, except La.
   (c) the alkali metals
   (d) the alkaline earth metals Carbon monoxide is remarkably effective bonder to metals, providing conductive conjugation with one or two metal atoms. In FIG. 7 is shown CO conductively conjugated to six metal atoms in a rhenium metal lattice (hexagonal close packed). This bonding may be thought of as a resonance hydride of $(6 \times 5)/2 = 15$ valence bond structures, as also sketched in FIG. 7A. In FIG. 7 the carbon atom is in the 001 plane of the hexagonal lattice, and the oxygen atom replaces a rhenium atom directly above or below the carbon atom along the hexagonal c-axis. Approximate calculations similar to those described below in the mathematical treatment, indicate that CO with transition metals constitute Class I enhanced superconductors, involving the vibrational (CO stretch) mechanism. Approximate calculations indicate the temperature enhancements to be comparable to the benzene-in-vanadium enhancements calculated in the Mathematical Section.

CLASS II

Class II superconductors of the present invention comprise enhancer molecules which when incorporated in a metallic lattice have associated therewith two systems of charge, a conjugated system of charge and a non-conjugated system of charge. The conjugated system of charge is conductively connected or conjugated with the conduction electrons of the metallic lattice such that conduction electrons can flow onto the conjugated system of charge for electronic interaction therewith. The non-conjugated system of charge is coupled to the conjugated system such that oscillations of the non-conjugated system force related oscillations of the conjugated system which in turn is in strong coupling interaction with conduction electrons of the lattice. In this manner electronic excitation of the non-conjugated system produce a strong binding of conduction electron pairs yielding enhanced superconductivity.

A typical example of a Class II superconductor of the present invention is pyrazine as an enhancer molecule incorporated in a metallic vanadium lattice, see FIG. 4. The nitrogen atoms of the pyrazine molecule form very strong conductively conjugated bonds to the conduction electrons of the vanadium metal, atoms. More particularly, the strong metal-molecule bonding is to the $\sigma$-electrons (in plane electrons) on the nitrogen, as well as to the $\pi$-electrons of the nitrogen (out-of-plane electrons). However, only certain symmetric $\pi$-orbitals (oscillating electron systems) of the pyrazine molecule become conductively conjugated with the vanadium lattice through the nitrogen atoms. (These symmetric $\pi$-orbitals are symmetric to reflection in a plane perpendicular to the plane of the aromatic ring of the pyrazine molecule and passing through the nitrogen atoms.) Other or antisymmetric $\pi$-orbitals of the pyrazine molecule are not conductively conjugated to the lattice. (These antisymmertic $\pi$-orbitals of pyrazine have a node at the nitrogen atoms.)

The mechanism for electron pairing is seen from FIG. 5. A first conductive electron flowing through the pyrazine molecule in the direction as shown excites a non-conjugated $\pi$-electron transition, corresponding to the charge distribution shown in FIG. 5.

This charge distribution is strongly attractive to a second electron following the first with the proper phase delay. In this manner the conduction electron pairs are bound with relatively high binding energies.

Representative calculations of transition temperatures for Class II superconductors of the present invention are given in the mathematical treatment below and an order of magnitude plot of calculated transition temperature Tc versus volume percentage of pyrazine enhancer molecules for the pyrazine-vanadium superconductor is shown in FIG. 6. Note that a superconducting transition temperature Tc of the order of room temperature is obtained when the volume percentage of pyrazine is of the order of 10–20%.

Pyrazine and vanadium systems are prepared, for example, by codepositing pyrazine molecules and vanadium atoms by preferred methods and apparatus described below to form an amorphous conductor.

Class II superconductor materials of the present invention are formed by conductively conjugating enhancer molecules selected from the class of molecules that have one, two or at most three conjugated atoms that can be used for synergic $\sigma-\pi$, or d-bonding to a single transition metal atom of the metallic lattice. Examples of such synergic bonders are given below in Tables I and III (except that carbon monoxide gives a Class I superconductor). The enhancer molecules of the present Class II superconductors include unsaturated molecules with (i) pyridyl nitrogen bonding sites
(i) diimine bonding sites
(iii) isocyanide bonding sites
(iv) trigonal phosphorous atom bonding sites
(v) trigonal arsenic bonding sites into metal lattices selected from the following classes of metals
(i) all transition metal superconductors
(ii) all alloy superconductors containing transition metals
(iii) all other transition metals excepting those which are ferromagnetic or antiferromagnetic.

Below are given specific examples of the various types of molecules described above which are useful for conductive-conjugation to the transition metals to yield FIG. 6 is a plot of superconducting transition temperature versus volume percentage of enhancer molecules for CLASS II and III superconductors of the present invention, FIG. 7 is a schematic diagram depicting a carbon monoxide enhancer molecule conjugatively bonded into a metallic rhenium lattice, FIG. 7A is a series of schematic diagrams showing the nature of the bond between the carbon atom and the rhenium lattice for the alloy of FIG. 7, FIG. 8 is a schematic diagram depicting a $C_5H_5$ radical incorporated into a metallic sodium lattice, FIG. 9 is a schematic longitudinal sectional view of a system for codepositing chemical enhancer molecules and metals to form superconductors of the present invention, FIG. 10 is an energy level diagram for pyrazine conductively conjugated to a metallic vanadium lattice, and FIG. 11 is an energy level diagram showing molecular $\pi$ orbital energy states for a molecule embedded in a metal.

The aforementioned three classes of superconductor materials will be separately described followed by methods of preparation and a mathematical analysis.

CLASS I

Class I superconductors of the present invention utilize a metal-enhancer molecule system wherein the enhancer molecule is conductively connected, conductively conjugated, to the conduction electrons of the metallic lattice such that conduction electrons of the metal flow through one or more atoms of the enhancer molecule. The enhancer molecule is selected for its large amplitude vibrational modes which produce large amplitude distortions of such molecule, for example, stretching and compressional mode distortions, torsional distortions, or bending mode distortions. These distortions produce a charge density fluctuation in the electron conduction paths of the molecule through which the conduction electrons of the metal lattice flow. The conduction electrons "see" the vibrationally produced charge density fluctuations of the enhancer molecule and are thus coupled thereto. These charge density fluctuations appear to the conduction electrons of the metal as a coupled electronic oscillator forcing the conduction electrons into a complementary mode of oscillation and thus binding together conduction electron pairs of the metal yielding enhanced superconductivity.

A typical example of a Class I superconductor material of the present invention includes the benzene molecule, $C_6H_6$, as the enhancer. The benzene molecule is conductively conjugatively bound into the metallic lattice as, for example, a body centered cubic, bcc, lattice of vanadium atoms such that conduction electrons of the metal flow through the benzene molecule. Since both Class I and Class II superconductors of the present invention use a conductive conjugated bond between the lattice and the enhancer molecule this type of bonding will be described more in detail below.

Referring now to FIG. 1 there is shown a benzene enhancer molecule conductively-conjugated in the (100) plane of a vanadium lattice. Small dotted circles represent atoms of vanadium at body centered positions of the body centered cubic, bcc, lattice. Circles around vanadium atoms in this (100) plane have radii equal to Pauling's metallic radius of vanadium. Circles around hydrogen atoms have Vander Waals radii.

The vibrationally produced charge density fluctuations which are coupled to the conduction electrons of the lattice can be seen by reference to FIG. 2. In FIG. 2 a conduction electron enters from below the benzene molecule and leaves from above, and as indicated is electronically coupled to a stretching and compressional vibrational mode of the molecule, as follows: As the benzene molecule is stretched due to the conduction electron passing through it, see arrows, the sides of the molecule are pulled apart thus producing an uneven distribution of charge density around the loop of the benzene molecule. More particularly the charge density on bonded carbon atoms moving away from one another looks positive to the conduction electron, and the other two atoms become more negative. These charge density fluctuations are closely coupled to the conduction electrons flowing through the molecule and serve as the electronic oscillation for binding together pairs of conduction electrons, thereby yielding enhanced superconductivity. Other vibrational modes of the molecule provide this type of coupling, but the one indicated is especially effective.

Representative calculations of transition temperatures for Class I superconductors are found in the mathematical analysis section below and an order of magnitude plot of calculated transition temperature, $Tc$, versus volume percentage of benzene molecules for the benzene vanadium superconductor is shown in FIG. 3. Note that the superconductivity enhancement is modest for the Class I superconductor.

A relatively large volume fraction of benzene in a metalic vanadium lattice; for example, a volume fraction $f \approx 0.80$ (80%) is needed to obtain a transition temperatures of 6° K. Such a metal-enhancer molecule is produced, for example, by codepositing benzene molecules and vanadium atoms, by preferred methods and apparatus described hereinbelow, to form an amorphous conductor.

Class I superconductor materials of the present invention are formed by incorporating enhancer molecules selected from the following classes of unsaturated molecules.

A. Carbon monoxide.

B. Unsaturated molecules that form "$\pi$-bonds" with metal atoms. Recent tabulations of such molecules are given by E. O. Fisher, and H. Werner, "Metall-$\pi$-Komplexe mit di- und oligoolefinischen Liganded," Verlag Chemie, Weinheim an der Bergstrasse. 1963, and E. O. Fisher and H. P. Fritz, "Compounds of Aromatic Ring Systems and Metals" published in Advances in Inorganic Chemistry and Radiochemistry, vol. 1, 1959, Academic Press. For a partial tabulation of such $\pi$-bonders, see Table II below. These unsaturated molecules that form $\pi$-bonds with the metal atoms include (i) Olefinic and acetylenic compounds
   (a) Olefinic and acetylenic hydrocarbons
      ethylene
      butadiene
      cyclohexadiene
      norbornadiene
      cyclo-octatetraene
      butenes
      acetylene
      carotene
   (b) Other olefinic and acetylenic compounds
      propenoic acid
      propenol
      cyclobutadiene carboxylic acid
      cyclopentadienone (ii) Aromatic compounds
   (a) Aromatic hydrocarbons
      benzene
      toluene
      naphthalene
      anthracene
      pyrene
      triphenylene
   (b) Other aromatic compounds
      benzoic acid
      aniline
      nitrobenzene
      benzene sulfonic acid
      thiophene
      naphthoic acids Class II superconductors of the present invention. Such examples are as follows: pyridine and pyrazine,

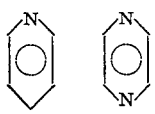

Other examples of Class II enhancers include: the other diazines

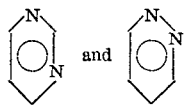 and as well as the triazines, including s-triazine,

Bipyridines, e.g.,

Phenanthrolines, e.g.,

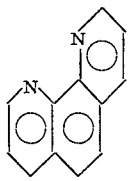

Polypyridines,

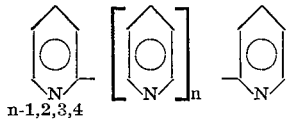

2,4,6-tris(2'-pyrimidyl)-1,3,5-triazine

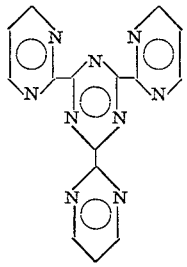

m-cyclohexapyridine

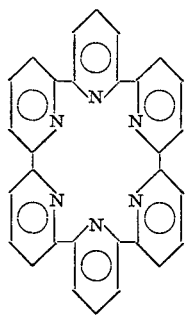

acridine

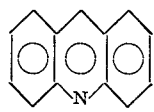

phenazine

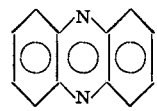

2,2' Biquinolines,

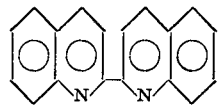

pyridyl-quinolines,

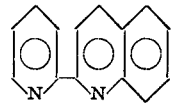

2,5-bis-(2'-pyridyl)-pyrazine

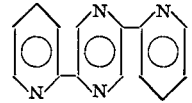

2,3-bis-(2'-pyridyl)-pyrazine

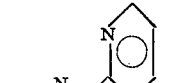

2,3,5,6-tetrakis-(2'-pyridyl)-pyrazine

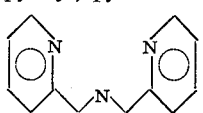

diimines,

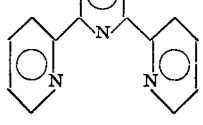

phosphines,

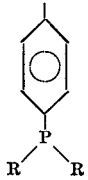

and arsines,

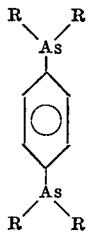

with configurations of substitutent groups, as well as larger ring systems, e.g.,

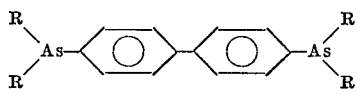

where R denotes alkyl, aromatic substituents, or other substituents, and the isocyanides such as phenylisocyanide,

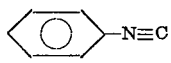

In connection with any of the cyclic compounds referred to above, e.g., pyridine, in which there are one or more replaceable, nuclear hydrogen atoms, these may, of course, be replaced by substituents such as alkyl (e.g., methyl, ethyl, n-propyl, decyl), aryl (e.g., phenyl, tolyl), non-hydrocarbon substituents such as nitro, amino, sulfo, chloro, bromo, etc.). Also when the cylic compound contains a ring which can be condensed with another ring, such variation can be practiced. For example, instead of pyridine, quinoline or isoquinoline may be employed. Where R is shown above it may be methyl, ethyl, phenyl, benzyl, etc.

Except for the cyclohexapyridine, the preparations of the above aromatic molecules containing pyridyl nitrogen atoms have been described in the literature. For a description of the preparation of these and related substances containing the —N=C—C=N— grouping, see "A Review of Synthesis of Organic Compounds Containing the Ferroin Group" by F. H. Case, published by the G. Frederick Smith Chemical Company, Columbus, Ohio. The cyclohexapyridine can be prepared by methods described in the above reference.

CONDUCTIVE CONJUGATED BONDS

Both Class I and Class II superconductors of the present invention employ an enhancer molecule conductively conjugatively bonded to the metallic lattice such that conduction electrons flowing in the lattice flow into or through the enhancer molecule for closely coupled electronic interaction with an electrical oscillator system thereof.

For the conductive conjugated bonding mechanism the enhancer molecule is bonded into the metallic lattice in the following manner:

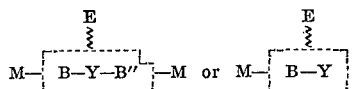

where M represents the metal atoms of the metallic lattice, B and B' are the bonding atoms or groups which may be the same or different and Y is the enhancer molecule E exclusive of the bonding atoms or groups B and B'. The enhancer molecule E forms a conjugated system of bonds to the metal atoms M as taken through the enhancer molecule E. Bonding atoms or groups B and B' form, for example, covalent bonds with the metal atoms M such that some or all of the molecular $\pi$-orbitals of the enhancer molecule E become strongly "mixed" with the conduction band orbitals of the metal. (This quantum mechanical "mixing" is described in some detail in the mathematical analysis below.) Alternatively, the bonding atoms or groups B and B' may form metallic bonds to the conduction electrons of the lattice.

It is not necessary that the current flow in one end of the molecules and out the other; a sufficient condition is that the current pass through at least one atom of the molecule.

Electrical neutrality of the bonded metal atom M is also desirable, since otherwise the $\pi$-electrons of the enhancer molecule E may tend to form relatively ineffective localized orbital states, corresponding to ionic bonds between molecule ions and metal ions, and this is specially undesirable if localized paramagnetic moments are formed. Thus, for the conjugative conductive bond mechanism, preferred enhancer molecules E bind metal atoms M in their zero- or low-valence states, and furthermore leave the bound metal atoms M essentially neutral.

A general type of chemical binding that satisfies the above criteria is the "synergic," or "double donor" type bond described by Orgel in "An Introduction to Transition-Metal Chemistry, Ligand Field Theory," by Leslie E. Orgel, John Wiley & Sons, Inc., N.Y., 1960, pp. 132–149. This type of bonding is especially important for the transition metal elements with incomplete d-shells (e.g., Ti, V, Cr, Mn, Fe, Co, Ni; Zr, Nb, Mo, etc.). The essential idea is that orbitals on the metal M atoms are divided into two groups, donor orbitals and acceptor orbitals; and the orbitals of the enhancer molecules E are likewise divided into two groups, acceptor orbitals and donor orbitals. Thus, the "Synergic bond" is one in which charge is transferred in both directions between metal atoms M and enhancer molecules E, leaving the two partners E and M essentially neutral. (An equivalent method of discussing this bonding involves the interaction between electronically excited states of the atom and/or molecule. From this point of view, molecules with low energy $\sigma \to \pi$ excitation energies can be expected to be especially good synergic bonders, other things being equal.) Since electrons can move back and forth freely from the metal orbitals to the enhancer molecule orbitals (especially $\pi$-orbitals), this synergic bonding is an example of the desired "conductive conjugation."

In Tables I–III below, are listed various bonding groups B or B' that are effective for conductive conjugation together with examples of enhancer molecules E using these different bonders B or B'. For convenience of discussion these bonding groups B or B' can be put into one of three categories:

(1) the $\sigma$, $\pi$ bonders,
(2) the $\pi$-bonders,
(3) the d-bonders.

The $\sigma$, $\pi$ bonders are enhancer molecules E that use *both* $\sigma$ and $\pi$ electrons in the molecule-metal atom linkage. The $\pi$ bonders are enhancer molecules E that use only $\pi$ electrons to bond to the metal atoms M. The d-bonders are enhancer molecules in which the metal-molecule bond involves predominantly d-orbitals on the bonded atoms B of the enhancer molecule E. For a further discussion of this type of classification, see Orgel, p. 134, referred to above.

TABLE I.—BONDING GROUPS EFFECTIVE FOR CONDUCTIVE CONJUGATION $\sigma$, $\pi$-BONDERS TO TRANSITION METALS

| Name of the Bonder B or B' | Bonding Atom(s) B or B' | Example of Enhance Molecule E |
|---|---|---|
| Pyridyl nitrogen | ≫N╱ | Pyrazine |
| Diimines | ≫N╱ | R–C=N, R–C=N (chelated to M) |
| Isocyanides | ⫿C | phenylisocyanide |
| Carbon monoxide | ⫿C | CO |

TABLE II.—π-BONDERS TO METAL ATOMS

| Number of π-Electrons | Example of Enhancer Molecule E | |
|---|---|---|
| | Molecule E | Name |
| 2 | \C=C/ | Ethylene. |
| 4 | [square] | $C_4H_4$ cyclobutadiene. |
| 5 | [pentagon] | $C_5H_5$ cyclopentadienyl. |
| 6 | [hexagon] | $C_6H_6$ benzene. |
| 7 | [heptagon] | $C_7H_7$ cycloheptatrienyl. |
| 8 | [octagon] | $C_8H_8$ cyclotatetraene. |
| 9 | [fused rings] | $C_9H_7$ indenyl. |
| 6 | [thiophene] | Thiophene. |
| 8 | [benzoquinone] | Benzoquinone. |
| 6 | [cyclopentadienone] | Cyclopentadienone. |
| 12 | [diphenyl] | Diphenyl. |

TABLE III.—d-BONDERS TO TRANSITION METALS

| Name of Bonder B or B' | Bonding Atom B or B' | Example of Molecule E |
|---|---|---|
| Phosphines | \|/P | P—(⬡)₃ |
| Arsines | \|/As | CH₃ CH₃ CH₃ CH₃ \As/ \As/ ⬡ |

CLASS III

Class III superconductor materials of the present invention employ a charged enhancer molecule non-conductively incorporated (ionic bond) into the metallic lattice to produce large amplitude electronic oscillations therein.

The charge on the enhancer radical causes an image charge to be induced on the atoms of the lattice which are closely adjacent the charge on the enhancer radical. This image charge is of opposite sign to that of the enhancer molecule and the image charge is localized on a few of the closest lattice atoms on both sides of the enhancer molecule with one half of the image charge located on either side. A conduction electron flowing through a region of image charge in the lattice upsets the initial image charge distribution causing positive image charge to transfer across the molecule to the area of the conduction electron. This transfer of charge appears as a virtual oscillation of the image charges across the enhancer molecule. These virtual electronic oscillations then are strongly coupled to conduction electrons since the interaction between the image charge and the conduction electrons occurs on common atoms of the lattice thereby producing high electron pair binding energies and commensurately high superconducting transition temperatures.

A typical example of a Class III superconductor according to the present invention is the $C_5H_5$ enhancer molecule embedded in a metallic sodium lattice. The bonding between the enhancer molecule and the lattice is essentially ionic and the metal-molecule system is depicted in FIG. 8. For this case there will be sodium atoms on each side of the $C_5H_5$ ring, and an electronic resonance is obtained between the two structures, A and B,

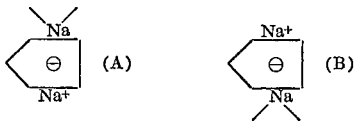

Resonance between these two structures (A and B) takes place through the virtual intermediate, back charge-transfer state,

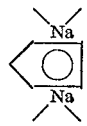

Here —Na— designates an essentially neutral sodium atom bonded to other sodium atoms of the metallic sodium lattice. Resonance between the structures A and B provides an electronic oscillator that couples together pairs of conduction electrons flowing in the lattice to form a Cooper pair, and thus enhance superconductivity.

Representative order of magnitude calculations of transition temperature for Class III superconductor materials are found in the mathematical analysis, below, and a plot of transition temperature $T_c$ as a function of volume percentage of $C_5H_5$ dissolved in a metallic sodium lattice is given in FIG. 6 where it can be seen that Class III superconductors compare favorably with Class II superconductors, yielding room temperature transition temperatures $T_c$ with but modest volume percentages of enhancer molecules as of 2 to 3%.

Class III superconductors of the present invention are formed by incorporating enhancer molecules that form molecule ions in the metallic lattice. These enhancer molecules are selected to be non-paramagnetic when incorporated in the lattice from a class (such as $C_5H_5$) that can accept an electron and thereby become diamagnetic, or from a class (such as diphenyl) that can accept two electrons and thereby remain diamagnetic. Also it is preferred that the negative charge be distributed over the whole enhancer molecule rather than being concentrated on a single atom; otherwise the acceptor atom may form an undesired localized ionic bond. Thus suitable classes of enhancer molecules include: single electron acceptor aromatic ring molecules such as the cyclopentadienyl radical, $C_5H_5$,

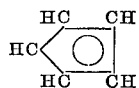

as well as substituted cyclopentadienyls (e.g., pentaphenylcyclopentadienyl) as well as molecules that yield $C_5H_5$ (or $C_5H_5^-$) when they react chemically with the suitable metals of the lattice called for below. The ionic nature of the $C_5H_5$ ring system is increased, as desired, by substituting electron negative (acceptor) groups on the $C_5H_5$ ring system. Examples of suitable negative groups include, CN, I, Br, F, and $NO_2$.

In addition suitable enhancer radical molecules include double electron acceptors such as diphenyl,

and cyclooctatetraene,

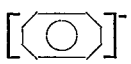

In general, aromatic molecules and substituted aromatic molecules containing two or more rings will serve as satisfactory double electron acceptors enhancer molecules.

In such molecules, nuclear hydrogen atoms may be substituted and condensed rings may be added as described above in connection with Class II enhancer molecules.

Metals for the metal-enhancer molecule system for Class III superconductors of the present invention are selected from the class including the alkali metals (Li, Na, K, Rb, and Cs) as well as alkaline earth metals (Be, Ca, Sr, Ba, and Ra) and also Sc, Y and lanthanum. In addition Zn, Hg, In, Sn, Sb, Pb, and Bi form the correct type of ionic bond for Class III superconductors with the $C_5H_5$ radical. This latter ionic bond is enhanced by substituting one or more negative groups such as CN, Cl, Br, F, and $NO_2$ on the $C_5H_5$ ring. When the $C_5H_5$ enhancer radical is substituted as aforesaid it will form the proper ionic bond to Tl metal.

PREPARATIVE CONSIDERATIONS

The extraordinary large range of metal-molecule combinations contemplated herein are obtained in a preferred method of the present invention by high vacuum techniques. More specifically, metal films are prepared by high vacuum evaporation of pure metals (or combinations of metals) and subsequent condensation to form a film with the enhancer molecules subsequently evaporated and deposited on the condensed metal surfaces, so as to form a "half-sandwich." The process may be repeated to form multiple decker sandwiches. Alternatively, metal atoms and enhancer molecules are co-evaporated to form a condensed metal-molecule matrix.

In special cases metal-molecule systems may be prepared by more conventional chemical techniques such as chemical vapor deposition; or in the case of specially stable and high melting organic molecules (e.g., $(C_6H_4)_6$*) the metal-molecule matrix is obtained by conventional co-melting techniques if the melting point of the metal is low enough.

Briefly, the high vacuum evaporation method for forming enhanced superconducting metal-enhancer molecule systems according to one embodiment of the present invention includes use of a high vacuum deposition apparatus of the general type shown schematically in FIG. 9.

The deposition apparatus comprises a gas tight evaporator chamber 17 as of liter volume having a pair of roughing refrigerated sorption vacuum pumps 18 connected thereto for evacuation thereof to a pressure of approximately $10^{-3}$ torr. In addition an ultrahigh vacuum ion pump 19 such as, for example, a 400 liter/sec. getter ion pump is connected to the chamber 17 for evacuation thereof to an ultrahigh vacuum of about $10^{-9}$ torr. A mass spectrometer 21 is also connected to the chamber 17 for analysis of the gas content thereof.

A high vacuum gate valve 22 selectively closes off the top end of the chamber and includes a condensing unit 23 coupled to the output port 24 of the gate valve assembly 22.

The condensing unit 23 serves to condense the evaporated metal and enhances molecules and comprises a liquid helium Dewar 25 with the vacuum chambers thereof opening into and being evacuated from the evacuated deposition chamber 17. The innermost reservoir of the dewar comprises a liquid chamber closed at its bottom by a condensing plate 26 of single crystal Z-axis cut quartz. The liquid helium is in direct fluid contact with one side of the condensing plate 26 while the other or condensing side of the plate 26 faces into the evacuated evaporation chamber via the intermediary of the gate valve assembly 22.

The condensing plate 26 is heat shielded from the evaporating chamber by means of a pair of copper heat shields 27, the outer shield being operated at liquid nitrogen temperature and the inner shield operated at liquid helium temperature. The shields are apertured for providing an optically clear passageway between the evaporation sources of the evaporation chamber 17 and the condensing plate 26.

The evaporation chamber 17 includes therein a pair of resistance heated evaporation boats 28 and 29, one for the enhancer molecules and one for the metal. A pair of viewing ports 31 are placed in the chamber wall for observation of the evaporation and deposition. Also a liquid nitrogen Meissner trap 32 is contained within the chamber 17 for condensing certain undesired condensible gases.

A preferred general method for depositing enhanced superconducting metal-enhancer molecule systems of the present invention using the apparatus of FIG. 9 is as follows:

(1) Metal and enhancer molecules are put in their respective evaporation boats 28 and 29. (For enhancer molecules that form a solid or liquid, with high vapor pressure, these are admitted to the system through the gas ports at the time of Step No. 7.)

(2) The entire system is baked out at 100° C.

(3) The metal and enhancer molecules are thoroughly "degassed." That is, the large gate valve 22 is closed, and some metal is evaporated, and some of the enhancer molecules are evaporated. Deposits of enhancer molecules and metal on the inside of the system can be seen through its viewing ports 31.

(4) With metal and enhancer substance in place, the entire system is pumped with the ion pump 19 until the total pressure is not significantly greater than $10^{-9}$ torr.

(5) Liquid nitrogen is first added to the dewar; sometime later, liquid helium is added.

(6) The metal is then evaporated until a suitable thickness is condensed on the condenser plate 26.

(7) The enhancer molecules are then evaporated onto the condensed metal film surface.

(8) If desired, the condensed material can then be protected by the deposition of an inert substance such as silicon monoxide.

MATHEMATICAL TREATMENT

In this section the mathematical steps are adduced for calculation of the superconducting transition temperature for metal-enhancer molecule systems in general and in particular for the Class I benzene-vanadium system, for the Class II pyrazine-vanadium system and for the Class III sodium cyclopentadienide-sodium system.

Throughout these calculations we neglect the screened electron-electron repulsion, assuming for convenience that the electron-electron repulsion is just balanced by the usual phonon-coupled attraction. As far as the metals under consideration are concerned, this assumption is trivial inasmuch as the metals are either superconductors already or are almost superconducting. Furthermore, for the conjugative-conductive systems, Classes I and II, the ($\pi$-electron)-($\pi$-electron) interactions in the enhancer molecules are expected to be also strongly screened when

---

*K. Hansser u. Peter Fischer, Zeit. für Natürforschung, 19a, 816 (1964).

these π-electrons are conductively conjugated to the metal lattice.

CLASS I

The vanadium-benzene system is taken to have a fermi surface, with energy $\epsilon_f$. The occupied stationary eigenstates $\varphi_m$ (at 0° K.) and empty states $\varphi_{m'}$ (at 0° K.) take into account the strong elastic scattering expected in an amorphous material, including elastic scattering due to the enhancer molecules (benzene). The orbitals $\varphi_m$ and $\varphi_{m'}$ include molecular π-orbitals on the benzene molecules. This mixing of the orbitals of benzene and the conduction band of the metal can be described as follows.

Let $\pi$ be a molecular π-orbital of the benzene molecule. Let $k$ be some conduction band orbital state of the vanadium lattice that is degenerate with $\pi$. These states will in general strongly mix, leading to two new states $(\pi+k)/\sqrt{2}$ and $(\pi-k)/\sqrt{2}$. Now the state $(\pi-k)/\sqrt{2}$ will be degenerate with still another orbital state of the vanadium lattice, $k'$; and $(\pi+k)/\sqrt{2}$ will be degenerate with $k''$; etc. Thus the original π-molecular orbital state becomes strongly mixed with the vanadium conduction band states, and in fact the π-orbital of benzene becomes an integral part of these conduction band states. (For a related discussion of "virtual bound states" in intermetallic systems, see The Concept of Virtual Bound Level, J. Friedel, Metallic Solid Solutions, W. A. Benjamin, N.Y., 1963, Chapter XIX.)

Inelastic scattering coresponds to the scattering of electrons from the occupied states $\varphi_m$ to the empty states $\varphi_{m'}$, along with an associated excitation of a virtual oscillator of angular frequency $\omega_0$ and energy $\hbar\omega_0$. Associated with the quantum mechanical transition $\varphi_m \to \varphi_{m'}$ there is a charge-density fluctuation. According to the foregoing discussion, this charge-density fluctuation has π-molecular orbital character on the benzene molecule, which may be designated $\pi_m \to \pi_{m'}$, where $\pi_m$ and $\pi_{m'}$ are the π-molecular orbital components of $\varphi_m$ and $\varphi_{m'}$. This π-charge density fluctuation can excite benzene molecular vibrations. Of these, the carbon-carbon stretching vibrations are likely to be the more sensitive to the π-molecular orbital density fluctuations in simple molecules such as benzene. (This need not be the case for all the unsaturated molecules, especially molecules involving strain.) We consider explicitly the $e_{2g}$, $$\nu_{18}^{cc} = 1584.8 \text{ cm}^{-1} \text{ vibration}$$

(Molecular Spectra and Molecular Structure, II, Infrared and Romar Spectra, G. Herzberg, D. Van Nostrand Co., Inc., N.Y. 1945, pp. 118 and 364.)

The excitation of one-component of this degenerate vibration by the $\varphi_m \to \varphi_{m'}$ scattering is depicted schematically in FIG. 2.

To establish a superconducting state, we consider the pair of states $\varphi_m$ and $\overline{\varphi}_m$; here $\varphi_m$ and $\overline{\varphi}_m$ are related by time-reversal symmetry; they have oppositely directed spins. The matrix element $$S_{mm'} = \langle \varphi_m \overline{\varphi}_m | H_e | \varphi_{m'} \overline{\varphi}_{m'} \rangle \quad (1)$$

where $H_e$ is the effective Hamiltonian for the vibronic-coupled electron-electron pair scattering, can be obtained by a Frolich-type second-order calculation, which yields, $$S_{mm'} = \frac{-2|V_{mm'}|^2 \omega_0}{\hbar(\omega_0^2 - \omega_{mm'}^2)} \quad (2)$$

Here $V_{mm'}$ is the matrix element for the (π-electron)-(benzene-vibration) vibronic interaction, $$h_{mm'} = \langle \varphi_m; 0 | h | \varphi_{m'}; \hbar\omega \rangle \quad (3)$$

and $h$ is the interaction between a π-electron and the carbon-carbon molecular vibrations, as discussed previously $$h = \sum_{ij} |\pi_i\rangle \beta_{ij} \langle \pi_j| \quad (4)$$

$$\beta_{ij} = \beta^0 + \beta_{ij}' \delta_{ij} + 1/2 \beta_{ij}'' \delta_{ij}^2 + \ldots$$

Here $|\pi_i\rangle$ is a π-atomic orbital centered on carbon atom $i$; $\beta_{ij}$ is the molecular orbital resonance integral between carbon atoms $i$ and $j$, and $\delta ij$ is the distortion of the $ij$ bond length from its average value.

The conduction electron energy differences $\epsilon_{m'} - \epsilon_m$ are equal to $\hbar\omega_{mm'}$. In the weak coupling limit, where $\omega_0 \gg \omega_{mm'}$ for all the states $m$ and $m'$ that are important for the superconducting energy gap, the scattering matrix $S_{mm'}$ can be replaced by an average two-electron scattering matrix element $\overline{V} = \langle S_{mm'} \rangle$ where $$\overline{V} = \frac{2 \langle |h_{mm'}|^2 \rangle}{\hbar \omega_0} \quad (5)$$

and where $\langle |h_{mm'}|^2 \rangle$ designates an average of $$\frac{-2|h_{mm'}|^2 \omega_0^2}{(\omega_0^2 - \omega_{mm'}^2)}$$

over the states $m$ and $m'$ for which $\omega_0 > \omega_e$. For qualitative re-express $\overline{V}$ in the following form, $$\overline{V} = -2 \left( \frac{e\delta}{\Delta} \right)^2 \frac{C}{\hbar \omega_0} \quad (6)$$

Here $\Delta$ is the total volume of the metal-molecule system under consideration, and $\delta$ is an effective volume of the enhancer molecules in which a conduction electron undergoes an effective energy of interaction for scattering equal to $e$. It will be noted that any matrix element of the form $h_{mm'}$ can be written, $$h_{mm'} = b_m^* b_{m'} \langle \pi_m 0 | h | \pi_{m'}' \hbar\omega_0 \rangle \quad (7)$$

where $b_m \pi_m$ is the component of benzene molecular π-orbital in $\varphi_m$, and where $\langle \pi_m^* | \pi_m \rangle \equiv 1$. Thus, $$|h_{mm'}|^2 = |b_m|^2 |b_{m'}|^2 |\langle \pi_m; 0 | h | \pi_{m'}; \hbar\omega_0 \rangle| \quad (8)$$

When $e^2$ is used to represent a suitable averaged value of $$|\langle \pi_m; 0 | h | \pi_{m'}; \hbar\omega_0 \rangle|$$

then it is seen, that on the average $|b_m|^2$, should be of the order of $\delta/\Delta$, where $\delta$ is the volume of space occupied by the π-orbitals of benzene. It is noted that in general a matrix element squared, represented by $e^2$, should vary like $1/\delta$, so that $\overline{V}$ in Equation 6 above is actually proportional to $\delta c/\Delta$, the total volume of enhancer molecules in the system. An order-of-magnitude estimate of a quantity such as $e$ can be obtained from earlier calculations of vibronic coupling in the benzene negative ion.

For the $e_{2g}$ vibration mentioned above, a coupling of the order of 1000 cm.$^{-1}$ (⅛ ev.) is reasonable.

An order-of-magnitude estimate of a superconducting transition temperature can be obtained using the well-known BCS result (weak-coupling limit):

$$kT_c = 1.14 \hbar \omega_0 \exp\left(-\frac{1}{\rho \overline{V}}\right) \quad (9)$$

Here $\rho$ is the density of states at the fermi surface.

For a simple free electron gas in a volume $\Delta$ with a fermi energy $\epsilon_f$, the density of states $\rho$ is, $$\rho = \frac{\Delta}{2\pi^2} (2m)^{3/2} \epsilon_F^{1/2} \frac{1}{\hbar^3} \quad (10)$$

Thus, the transition temperature is determined in part by the product $\rho \overline{V}$, $$\rho \overline{V} = -\frac{(2m)^{3/2} \epsilon_F^{1/2} \delta^2 e^2 C}{\pi^2 \hbar^3 \hbar \omega_0} \quad (11)$$

When $\epsilon_F$, $e$ and $\hbar\omega_0$ are expressed in electron-volts, and $\delta$ is in $(A)^3$ and $C$ is in molecules per $(A)^3$, then Equation 11 may be written $$\rho \overline{V} = -1.39 \times 10^{-2} \frac{\epsilon_F^{1/2} \delta_e^2 C}{\hbar \omega_0} \quad (12a)$$

Equation 12a above can be written in an alternative convenient form, $$\rho \overline{V} = -1.39 \times 10^{-2} \frac{\epsilon_F^{1/2} \delta_e^2 f}{\hbar \omega_0} \quad (12b)$$

where $f = \delta c$ is the volume fraction of the molecule-metal system that is occupied by the enhancer molecules. Although it can hardly be claimed that accurate values for superconducting transition temperatures can be obtained using Equations 9 and 12, these equations do on the other hand provide us with a useful order-of-magnitude estimate for the essential quantities and problems involved. For the carbon vibration of benzene at 1584.8 cm.$^{-1}$, corresponding to $\hbar \omega_0 \simeq 0.2$ ev., calculated transition temperatures as a function of the volume percentage are given in FIG. 3. In this calculation a reasonable order-of-magnitude value for the fermi energy is $\epsilon_F = 9$ ev. The value selected for $e = \frac{1}{8}$ ev., comes directly from previously calculated vibronic (electron-vibrational) interactions in benzene ("Hyperfine Interactions in Orbitally Degenerate States of Aromatic Ions," by H. M. McConnell, and A. D. McLachlan, J. Chem. Phys. 34, 1 (1961)). The value of $\delta = 60(A)^3$ corresponds to six times the atomic volume of a carbon atom in a graphite lattice.

The foregoing calculations of the enhancement of superconductivity by the vibrational conduction-conjugative mechanism is expected to be typical of most, but not all, unsaturated molecules that give this type of enhancement. The enhancements in FIG. 3 are indeed rather modest, especially when it is realized that for volume percentages of benzene much over 80% the above calculations are unrealistic, since the system will become an insulator. This result is of course not surprising since the well known phonon (crystal vibrations) mechanism in known superconductors does not lead to high superconductivity transition temperatures.

CLASS II

Class II enhanced superconductors utilize molecules that are conductively conjugated to the metal lattices, especially transition metals, and utilize the electronic oscillator mechanism to enhance the formation of Cooper pairs, and thus to enhance the superconductivity transition temeprature. As an example of a Class II enhanced superconductor the transition temperature of the pyrazine-vanadium system described above in this application is calculated below. To do this, the $\pi$-molecular orbitals of this molecule are first considered.

Refer to FIG. 5 which defines the Cartesian $x$, $y$, $z$ axes relative to a pyrazine molecule. The $z$-axis passes through the center of the molecule and is perpendicular to the molecular plane. The $y$-axis passes through the center of the molecule and through the two nitrogen atoms. All the molecular $\pi$-orbitals are antisymmetric $(-)$ to reflection through $xy$ plane $(z \to -z)$. Some of the $\pi$-orbitals are symmetric to reflection in the $y-z$ plane $(x \to -x)$. These are the conjugating $\pi$-orbitals and are designated $\pi_i^c$. Some of the $\pi$-orbitals are antisymmetric to reflection in the $yz$ plane. These orbitals have a node (zero amplitude) at the nitrogen atoms, and are hereafter referred to as the non-conjugating $\pi$-orbitals. They are designated $\pi_j^n$. A set of self-consistent field orbitals $\pi_i^c$ and $\pi_j^n$ have been worked out by Kon. (H. Kon, "A Semi-empirical Approach to the SCF Molecular Orbitals," Bull. Chem. Soc. Japan, 28, 275 (1955). Alternatively, see R. G. Parr, "The Quantum Theory of Molecular Electronic Structure," W. A. Benjamin, Inc., New York, 1963, p. 285.) For pyrazine, the conjugating $\pi$-orbitals are, in order of increasing one-electron energy, $\pi_1^c = 0.3646(\chi_1 + \chi_2 + \chi_4 + \chi_5) + 0.4838(\chi_3 + \chi_6)$
$\pi_2^c = 0.2397(\chi_1 - \chi_2 - \chi_4 + \chi_5) - 0.6205(\chi_3 - \chi_6)$
$\pi_4^c = 0.3421(\chi_1 + \chi_2 + \chi_4 + \chi_5) - 0.5157(\chi_3 + \chi_6)$
$\pi_6^c = 0.4388(\chi_1 - \chi_2 - \chi_4 + \chi_5) + 0.3390(\chi_3 - \chi_6)$ and the non-conjugating $\pi_j^n$ orbitals are, in order of increasing energy, $\pi_3^n = 0.5000(\chi_1 + \chi_2 - \chi_4 - \chi_5)$
$\pi_5^n = 0.5000(\chi_1 - \chi_2 + \chi_4 - \chi_5)$ For convenience, we use the same numerical values for the subscripts $i$ and $j$ in $\pi_i^c$ and $\pi_j^n$ as does Kon. The $\chi_i$ are $2p\pi$ atomic orbitals centered on atoms $i$, $i = 1, 2, 3, 4, 5, 6$ (see FIG. 5).

When the nitrogen atoms of pyrazine are conductively conjugated with vanadium atoms the $\pi$ electrons in the $\pi_i^c$ orbitals become a part of the conduction band of the metal, and are accordingly strongly screened from one another. On the other hand, the electrons moving in the $\pi_j^n$ orbitals are not so effectively screened from one another, and are especially not screened from the conduction electrons. As we shall see below, this very strong coulomb interaction between the $\pi_j^n$ electrons and the $\pi_i^c$ electrons leads to a large enhancement of superconductivity.

The one-electron transition $\pi_3^n \to \pi_5^n$ acts as the electronic resonance oscillator for the pyrazine enhancer, with frequency $\hbar \omega_0$. In the ground electron configuration of pyrazine the $\pi_3^n$ orbital is doubly occupied and the $\pi_5^n$ orbital is empty. The orbitals $\pi_1^c$, $\pi_2^c$, $\pi_4^c$ and $\pi_6^c$ become thoroughly mixed with the conduction band states $k$ of the metal, but orbitals $\pi_2^c$ and $\pi_4^c$ are expected to be most strongly mixed with the states near the fermi surface, and since these states are primarily responsible for conductivity and superconductivity, we neglect the other states $\pi_1^c$ and $\pi_6^c$. The energy level scheme for the pyrazine molecule conductively conjugated to a vanadium lattice is sketched in FIG. 10. The transition charge distribution $\pi_3^n \to \pi_5^n$ corresponding to an oscillation of the nonconjugated $\pi$-electrons is

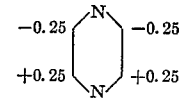

We may now use the previous formulas for the calculation of the superconducting transition temperature of the pyrazine-vanadium system by using for $e$, instead of a vibrational interaction described previously in connection with Equations 4–8, the coulomb scattering matrix element, $$e = \langle \pi_3^n(1) \pi_5^n(1) \left| \frac{q^2}{r_{12}} \right| \pi_2^c(2) \pi_4^c(2) \rangle$$

where $q$ is the charge on the electron and $r_{12}$ is the distance between the two electrons. The above matrix element may be thought of as the coulomb scattering of a non-conjugated $\pi$-electron by a conjugated-conductive $\pi$-electron.

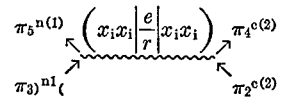

This coulomb interaction is extremely large, the largest terms arising from the repulsion of the two electrons when they are on the same atom $$e \simeq 0.082 \langle \chi_p(1) \chi_p(1) \left| \frac{e^2}{r_{12}} \right| \chi_p(2) \chi_p(2) \rangle$$

Here $\chi_p$ is an atomic orbital centered on carbon atoms $p = 1, 2, 4$ or $5$. The value of this integral is ca. 17 e.v., so $e \simeq 1.4$ ev. Just as in the case of benzene we take $\delta \simeq 60$ $(A)^3$. The calculated superconducting transition temperature using Equation 12b and a reasonable estimated excitation energy $\hbar \omega_0$ of 5 e.v. is given in FIG. 6 as a function of the volume percentage of pyrazine in the vanadium lattice. It will be seen that this enhancement is exceedingly large even for modest concentrations of enhancers. Comparable results are expected for other $\sigma$, $\pi$ as well as $d$ bonding conjugative-conductive enhancer molecules, but in the absence of the symmetry features present for pyrazine such calculations become extraordinarily difficult and particularly uncertain for the pure $\pi$ and $d$ bonders. The difficulty that arises when there is no sharp classification of the molecular $\pi$-orbitals into conductive-conjugated $\pi_i{}^c$ orbitals, and non-conductive-conjugated $\pi_j{}^n$ orbitals can be seen by reference to FIG. 11. In this figure there are semi-sharp $\pi$-levels ("virtual bound states") embedded in the continuum, which have properties intermediate between delocalized and localized orbital states. Although such states will certainly contribute to the enhancement of superconductivity, quantitative calculations are obviously difficult.

CLASS III

Now, turning to an illustrative calculation of the superconducting transition temperature of a Class III enhancer system consisting of metal atoms and enhancer molecules that undergo charge-transfer interactions with the metal atoms, the case of the cyclopentadienyl radical incorporated in a metallic sodium lattice is considered. A schematic diagram of a probable structure for this metal-molecule situation is sketched in FIG. 8. The flat planar $C_5H_5$ ring lies in the 100 (or 010, or 001) plane, with sodium atoms directly above and below the plane. Because of the known high electron affinity of the cyclopentadienyl ring, the $C_5H_5$ molecule will be present in the metallic structure as a (diamagnetic) negative ion, $C_5H_5{}^-$. The image charge for the negative ion ring will be localized primarily on the two sodium atoms directly above and below the ring, half of the positive image charge being on the average on one sodium atom, and half on the other. As mentioned above, these average charge distributions can be thought of as arising from quantum mechanical resonance between the two structures, A and B.

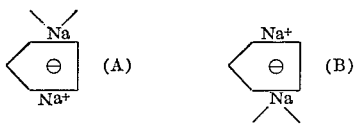

The resonance takes place through a virtual intermediate state,

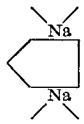

Approximate estimates of the energy associated with this oscillation, $\hbar \omega_o$, are in the range $\hbar \omega_o \sim \frac{1}{8}$ ev. Conduction electrons moving through the metallic sodium lattice will also pass through the $Na^+$ ions directly above and below the $C_5H_5{}^-$ ring, and this energy of interaction is estimated to be $e \sim 1$ when a conduction electron is on one of these sodium ions. The volume $\delta$ is taken to be of the order of the atomic volume of sodium in metallic sodium, $\delta \sim 40$ (A)$^3$.

The foregoing formula Equation 12b is used to estimate the superconducting transition temperature as a function of the volume fraction of $C_5H_5$ in the metallic sodium lattice. The results of the calculation are given in FIG. 6.

NON-SUPERCONDUCTIVE APPLICATIONS

The discussion hereinabove has been with reference to alloys which are superconductors. This objective places certain limitations upon the selection of materials (both metals and enhancer molecules). However, there are other useful properties of the general class of alloys wherein organic molecules or radicals are incorporated in the lattice of a metallic crystal or form a solid solution in the metal. Thus, any organic molecule or radical can be incorporated in a metal in the form of a solid solution or as an integral part of the crystal lattice. Useful properties of such alloys apart from superconductivity (when present) are to enhance the strength of metals; to modify the mechanical properties of metals; to reduce conductivity at temperatures above $T_c$; to modify the optical properties of thin metal films (e.g., for decorative purposes, to modify the light absorption characteristics, etc.); to modify catalytic properties of metal surfaces; to modify magnetic properties, especially of ferromagnetic and antiferromagnetic metals.

The fact that an organic compound or radical is volatile and/or unstable does not preclude its use because it can be incorporated in the metal lattice or dissolved in the metal to form a solid solution, in which case the volatile and/or unstable molecule or radical is held in the lattice or solute and is stabilized. Metals which may be excluded for superconductive purposes (as in the case of alkali metals for Class I superconductors, supra) may be used for such other purposes. Also, the selection of organic molecules and radicals is much wider. For example, saturated aliphatic molecules such as methane, butane, ethanol, dodecanol, organometallic molecules such as metal alkyls which may not have the electrical properties required for superconductors may be employed. Also, a wide choice of free radicals, such as methylene ($-CH_2$), imine ($-NH$), methyl ($-CH_3$), phenyl, benzyl, cyclohexyl, vinyl, substituted phenyl, benzyl and vinyl radicals may be employed some of which may be expected to provide superconductors, and all of which will modify the metal in one or more of the useful effects mentioned above.

The proportions of (1) organic molecule or radical and (2) metal may vary widely. A very small amount of (1), e.g. 0.1% by volume or less can in certain cases (e.g., in the modification of optical properties) produce a significant change or modification. (Volume percent is based on volumes of starting materials.) In superconductors at least about 1% is preferred. Percentages up to 80% or more may be used.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed:

1. A composition of matter in solid form consisting essentially of at least one metallic component, such metallic component being present in quantity sufficient that the composition is an essentially metallic electrical conductor, said composition also comprising a nonmetallic component in the form of organic molecules and/or radicals, such nonmetallic component being present in sufficient amount to modify substantially the properties of the metallic component, said nonmetallic component forming an alloy with the metallic component.

2. The composition of claim 1 wherein the metallic component and the nonmetallic component are selected to provide a composition having a substantially higher $T_c$ than the metallic component by itself.

3. The composition of claim 2 wherein the metal or metals of the metallic component are selected from the class consisting of all metals other than ferromagnetic metals, antiferromagnetic metals, the lanthanides other than lanthanum, the alkali metals and the alkaline earth metals.

4. The composition of claim 3 wherein the nonmetallic component consists in at least substantial part of molecules selected from the class of open and closed chain olefinic and acetylenic molecules.

5. The composition of claim 4 wherein said molecules consist in at least substantial part of hydrocarbon molecules.

6. The composition of claim 4 wherein said molecules consist in at least substantial part of heteromolecules wherein the hetero groups are devoid of such high electron affinity as will substantially reduce the superconductive properties of the composition.

7. The composition of claim 4 wherein the nonmetallic component consists in at least substantial part of unsaturated organic molecules which form $\pi$ bonds with metal atoms.

8. The composition of claim 3 wherein the nonmetallic component consists in at least substantial part of carbon monoxide.

9. The composition of claim 2 wherein the metal or metals of the metallic component are selected from the class of nonferromagnetic and nonantiferromagnetic transition metals.

10. The composition of claim 9 wherein the nonmetallic component consists in at least substantial part of molecules having conjugated atoms capable of $\sigma$-$\pi$ or $d$-bonding to transition metal atoms.

11. The composition of claim 10 wherein such molecules having conjugated atoms are aromatic heterocyclic molecules containing one or more nitrogen atoms as hetero elements of the aromatic ring or rings.

12. The composition of claim 10 wherein such molecules having conjugated atoms are aromatic posphines.

13. The composition of claim 10 wherein such molecules having conjugated atoms are aromatic arsines.

14. The composition of claim 10 wherein such molecules having conjugated atoms are aromatic isocyanides.

15. The composition of claim 2 wherein the metal or metals of the metallic component are selected from the class consisting of alkali metals, alkaline earth metals, scandium, yttrium, lanthanum, zinc, mercury, indium, tin, antimony, lead and bismuth.

16. The composition of claim 15 wherein the nonmetallic component consists in at least substantial part of molecules that form ions in the lattice of the metallic component.

17. The composition of claim 15 wherein said molecules consist in at least substantial part of organic, nonparamagnetic molecules that are capable of accepting one or more electrons from the metal of the metallic component and are capable of becoming incorporated in the lattice of the metallic component as anions.

18. The composition of claim 17 wherein said organic molecules are single electron acceptor aromatic ring molecules.

19. The composition of claim 18 wherein the aromatic ring molecules are cyclopentadienyls.

20. The composition of claim 17 wherein said organic molecules are double electron acceptors.

21. The composition of claim 20 wherein said double electron acceptors are diphenyls.

22. The composition of claim 20 wherein said double electron acceptors are cyclooctatetraenes.

23. A method of producing a metal-organic system which comprises providing a condensing surface and a vacuum chamber, evacuating and degassing the said chamber and condensing surface, the vacuum produced being an ultra-high vacuum, cooling the condensing surface to substantially the temperature of liquid helium, introducing into said chamber the vapor of a metal and an organic material in the gaseous state and causing the metal vapor and gaseous organic material to condense on the condensing surface.

24. The method of claim 23 wherein the metal and organic material are condensed in sequence to form a laminar structure consisting of at least one thin film of metal and one thin film of organic material deposited on the film of metal.

25. The method of claim 23 wherein the metal and organic material are co-deposited.

References Cited

UNITED STATES PATENTS

| 3,097,977 | 7/1963 | Amick et al. | 148—33.3 X |
| 2,353,612 | 7/1944 | Gardner | 117—107 |

OTHER REFERENCES

Calvin et al., Extraterrestrial Life: Some Organic Constituents of Meteorites and Their Significance for Possible, etc. Proceeding of Intern. Space Science Sym., 1st Nire (1960) QC 80116, pp. 1180–1190.

LEON D. ROSDOL, *Primary Examiner.*

J. D. WELSH, *Assistant Examiner.*